United States Patent [19]

Le Béon et al.

[11] Patent Number: 4,759,146
[45] Date of Patent: Jul. 26, 1988

[54] METHOD FOR UNDERMINING AN IMMERSED GROUND AND FOR GENERATING AN ASCENDING WATER CURRENT, AND DEVICE FOR IMPLEMENTING SUCH A METHOD

[76] Inventors: Roger Le Béon, Manoir de la Villeneuve, 56150 Baud; Armel Jego, 14 rue Marcel Achard, 56600 Lanester, both of France

[21] Appl. No.: 852,639
[22] PCT Filed: Jun. 24, 1985
[86] PCT No.: PCT/FR85/00167
§ 371 Date: Feb. 25, 1986
§ 102(e) Date: Feb. 25, 1986
[87] PCT Pub. No.: WO86/00193
PCT Pub. Date: Jan. 16, 1986

[30] Foreign Application Priority Data
Jun. 27, 1984 [FR] France .................. 85 10429

[51] Int. Cl.⁴ .............................................. A01K 73/02
[52] U.S. Cl. .......................................... 43/4.5; 43/6.5; 43/9; 56/8; 56/9
[58] Field of Search .......................... 43/4, 4.5, 6.5, 9; 37/79, 59, 70; 56/8, 9

[56] References Cited

U.S. PATENT DOCUMENTS

| | | | |
|---|---|---|---|
| 436,935 | 9/1890 | Corwin | 56/8 |
| 991,333 | 5/1911 | Lybeck | 56/9 |
| 2,029,858 | 2/1936 | Couch | 56/9 |
| 3,783,535 | 1/1974 | Hanks | 43/6.5 |
| 3,866,396 | 2/1975 | Meyer | 56/9 |
| 4,259,828 | 4/1981 | Pace | 56/9 |
| 4,434,572 | 3/1984 | Sheldon | 43/4.5 |

*Primary Examiner*—Kurt Rowan
*Attorney, Agent, or Firm*—Roland Plottel

[57] ABSTRACT

The invention concerns a procedure for undermining underwater terrain (S) thus creating an upward rising current (Tj) able to lift items lying on the terrain (S) or half-buried in it, in order to collect them in a recovery net. The invention also covers devices to be used for harrowing and cleaning shell-fish beds or for dredge-fishing shell-fish.

10 Claims, 2 Drawing Sheets

METHOD FOR UNDERMINING AN IMMERSED GROUND AND FOR GENERATING AN ASCENDING WATER CURRENT, AND DEVICE FOR IMPLEMENTING SUCH A METHOD

The invention concerns a procedure intended to create an underwater vortex, bringing about on the one hand an undermining of the bottom and on the other an upward rising water current capable of dislodging and lifting items lying on or half-buried in the bottom. The invention also concerns the device for carrying out such a procedure.

In the fishing industry, and particularly that of shell-fish, a technique known as dredge-fishing is often employed. This consists in lifting up the desired species and dragging them into a recovery net.

In another area, that of the preparation and maintenance of rearing beds for these shell-fish, in particular oyster-beds, the cultivator must go over the beds regularly with a harrow. This turns the bed, lifts up half-buried shellfish, and spreads them out more evenly.

The devices currently employed in such tasks, whether harrows or dredging nets, have numerous disadvantages. On the one hand they are heavy and cumbersome, and on the other they often cause damage to the whole local underwater environment. By raking the bed with teeth or blades, they can destroy the flora and fauna in their path and damage fish and shell-fish.

To overcome this drawback a device which creates an upward current was developed and described in an earlier patent application, made 26/10/1982 under the registration number 82178 74.

This uses a winged-shaped device which descends almost to the bottom, creating a mass of water and avoiding any direct contact between the device and the bottom. An upward rising current is created underneath and behind the device, carrying along the lighter items (fish, shell-fish, sand, etc.) which can then be then gathered into a recovery net.

However, despite the advantages of such a system over traditional methods, it still leaves something to be desired. The uncovering is not always effective. Again, the distance between the bottom of the wing and the sea floor must be very small, if the best results are to be obtained.

The invention described here has been designed to get round these disadvantages. It concerns a new process intended to create an efficient uncovering of the sea bed, and an upward rising current of water which carries up items lying on the sea floor or half-buried in it. The device can operate at a considerable distance from the sea bottom.

The invention offers an optimisation of results, in relation to the particular application chosen and the density of the species to be lifted or harvested.

It also covers all arrangements for operating the process. A first application plays the role of the harrow described above, and is used for maintenance of the sea floor, for example in oyster beds. Another application includes additional modifications which make it suitable for dredge-fishing of a variety of shell-fish, crustaceans and flat-fish.

More precisely this invention concerns a process for undermining the sea bed and creating an upward rising water current characterized by the fact that it causes at least one cylinder to rotate and at the same time confers on it a forward movement in such a way that an upward vortex is produced, capable of lifting items lying on the sea bed and carying them up on a trajectory which allows them to escape from the area of turbulence created by the said cylinder.

The invention will be better understood by referring to the explanations below and the attached diagrams, among which are:

For greater clarity, the same items bear the same reference numbers in all the illustrations.

The process, in conformity with the invention, consists in creating a vortex intended to disturb the sea bed sufficiently to lift up items of a given order of weight which may be lying on the sea floor. This effect may be used either to distribute these items evenly, or to gather them up into a recovery net.

The term "item" is designated to cover shell-fish, such as oysters, scallops, crustaceans, and even flat-fish half-embedded in the sea floor, and in a more general way any kind of fauna flora or mineral that one might wish to recover.

This result is obtained, in conformity whith the invention, by the use of at least one cylinder ($5a$) of a diameter ($\phi 1$) caused to rotate (arrow Ra) and move forwards (arrow T). The axis of rotation ($xa$) of this cylinder ($5a$) is parallel to the bottom (S) of the sea, a lake or a river, and the axis of movement (T) is perpendicular to the said axis of rotation.

The direction of rotation of the cylinder ($5a$) is determined by the application chosen. Depending on whether it turns clockwise or anti-clockwise, the rising vortex occurs in front of or behind the cylinder in relation to the direction of movement (T).

Figure 1:
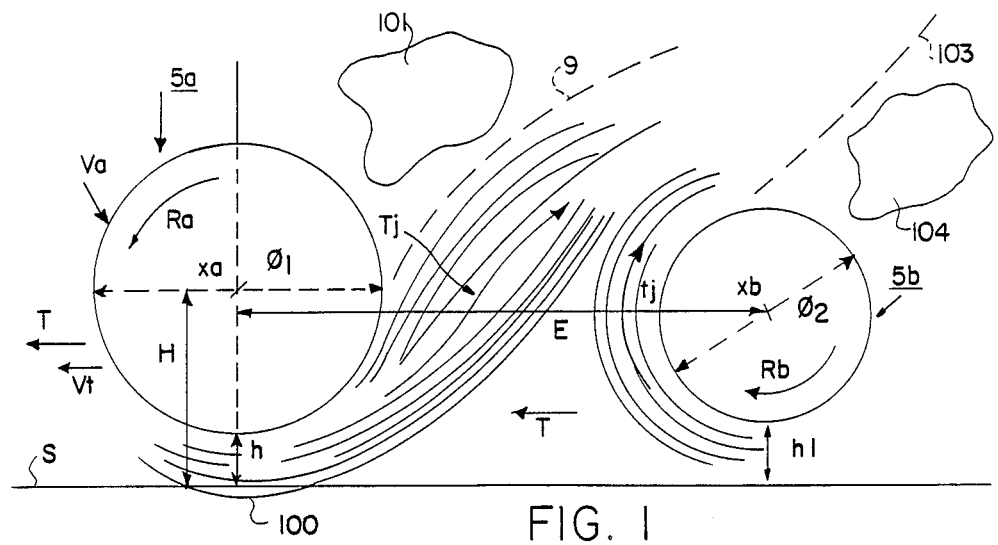
FIG. 1 is an explanatory diagram illustrating the process in conformity with the invention.

In FIG. 1, a clockwise direction (Ra) has been chosen for the cylinder ($5a$).

An important aspect of the invention is that the combined turning and forward movement of the cylinder causes a Magnus Effect, generating a movement of water in such a way as to undermine the bed in an area (100) and a current which lifts and drags upwards items lying on the bed or half-embedded within it.

The combined trajectories followed by the currents of water is depicted on the illustration by an indicative arrow (T).

The parameters which determine the results for a range of densities (d) are essentially: the height (h) of the edge of the cylinder ($5a$) from the sea-floor (S), the diameter ($\phi 1$) of the cylinder itself, and its peripheral speed (Va). By varying the diameter ($\phi 1$) and the eight (H) between the center of the cylinder in relation to the bottom, the working height (h) is automatically modified. The peripheral speed (Va) is about 3–4 times that of the forward movement.

Items lifted and carried up according to the trajectory (Tj) may be directed by means of a deflecting shutter (indicated by the dotted line (9)) away from the area of turbulence (101) which occurs behind the cylinder ($5a$) concerned.

A variation on the basic invention is shown in FIG. 1. and consists in combining the action of the two cylinders ($5a$) and ($5b$) with diameters of respectively ($\phi 1$) and ($\phi 2$), with the possibility that the diameter ($\phi 2$) may be smaller than ($\phi 1$), or the other way round. An important feature of the invention is that the second cylinder (5b) is made to turn in the opposite direction to the first cylinder (5a) as shown by the arrow (Rb). The axis of rotation (xb) is, like the axis (xa), parallel to the sea-floor, and perpendicular to the axis of movement (T). An important parameter (as in the former case) is the height (h1) between the edge of the cylinder (5b) and the sea-floor (S).

The combined water currents resulting from this procedure are shown behind cylinder (5b) by the arrow (tj). This water movement caused by the second cylinder (5b) forms a kind of barrier which helps to direct those items which have a tendency to escape back towards the trajectory (Tj).

This arrangement therefore helps to lift and guide all the items exposed and lifted by the vortex in such a way that they may then either fall back onto the sea-floor in a more even distribution or be collected in one way or another, as will be explained below. Here again a screen (103) may be employed to prevent the items from falling back into the zone of the vortex (104) which occurs behind the second cylinder (5b).

The distance (E) between the two axes of rotation (xa) and (xb) also constitutes an important control parameter which can be used in combination whith the above mentioned parameters, that is: the height (h) and (h1), the diameters ($\phi1$) and ($\phi2$) of the cylinders (5a) and (5b), as well as the respective peripheral speeds (Va) and (Vb) of the two cylinders.

The process described in the invention proves to be particularly effective in either version, both for sea floor maintenance and for fishing, on condition naturally that a recovery net is placed in the zone between the shutter (9) and the screen (103).

Figure 2:
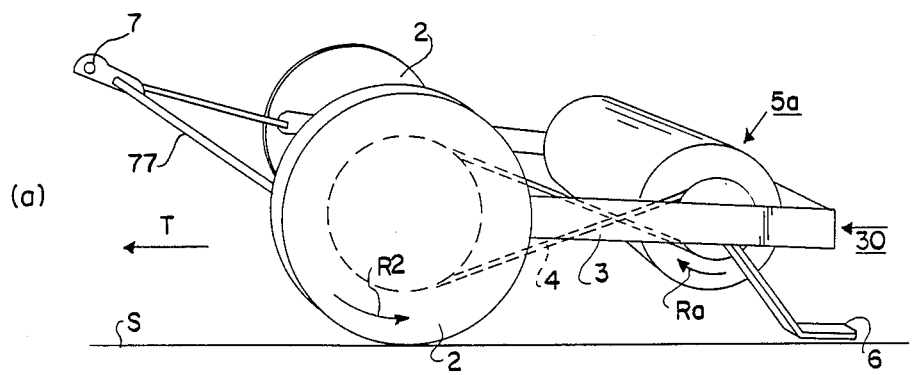
FIG. 2 illustrates diagrammatically a first and a second variant in conformity with the invention.
Figure 2:
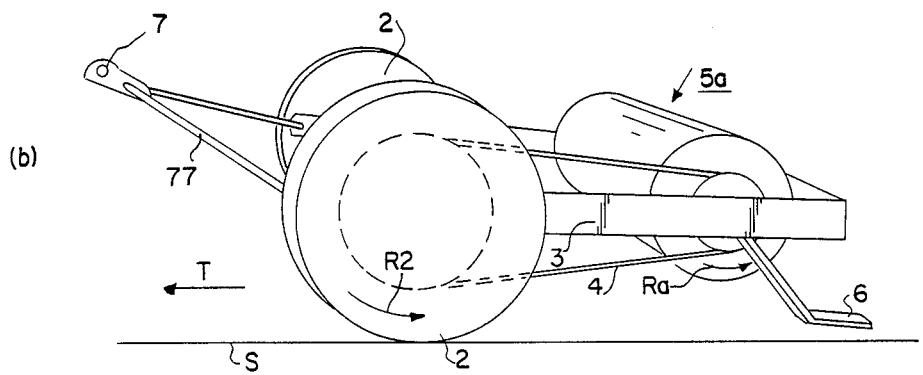

FIG. 2 shows two versions (a) and (b) of a device designed to put this invention into practice. In both cases, the method is the same, with only the direction of the rotation (Ra) of the cylinder (5a) differing.

The device is made up of a chassis (30) which may be, for example, made up of a frame with two arms (3) between which the cylinder (5a) is mounted.

In order to achieve the desired effect, the cylinder (5a) is moved both in rotation (Ra) and forward (T). These two movements may be independently controlled, or, as in the example shown, linked together.

In practice, the chassis (30) is mounted on a system of wheels (2) so that the rotation of the cylinder (5a) is linked to the rotation of the wheel (2), either directly or (as in the illustration) by means of a belt (4), or yet again by means of a chain engaged on a cogged gear or any other method of transmission. The chassis (30) is also equipped with a yoke (77) carrying a ring (7) intended to receive a sling (not shown) fixed to the boat or in a general way to the towing device chosen. Shoes (6) may also be used in order to give stability to the whole assembly.

A particularly interesting version of such a device is found notably in aqua-culture and especially in the preparation and maintenance of oyster-beds and other shell-fish cultivation. In fact, those engaged in this activity are constantly confronted by such problems as: sinking and embedding of their shell-fish, and displacement and dispersion of oysters and other shellfish under the influence of currents and marine flora, concentrating the population under cultivation in certain areas when they should ideally be distributed as evenly as possible.

Such cultivators must therefore carry out regular cleaning and distribution operations and the device described in this invention is particularly suitable for this activity. The very fact of dragging the chassis (30) along the axis of movement (T) causes the wheels (2) to rotate (arrow Rr) and (in the example shown) the cylinder (5a) to rotate also. In this way an upward rising current of water is created to the right of the cylinder (5a) which carries with it items lying on the sea floor (this effect is reinforced by the undermining action described above). These items are separated, whether they are stuck or bound together by sand, silt, mud or marine flora and fall back onto the bottom while being dispersed. This ensures an even distribution.

The respective dimensions of the cylinder (5a) and the wheels (2) and particularly the height (h) between the edge of the cylinder (S) and the bottom constitute the control parameters. These can be adapted in relation to the density (d) of the items concerned, as explained above.

Figure 3:
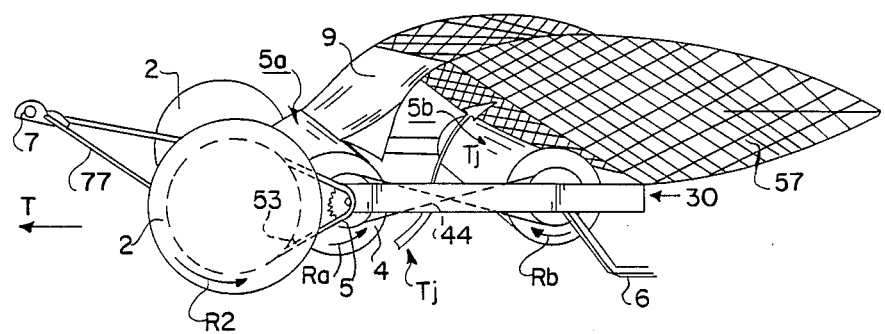
FIG. 3 illustrates a variant of the invention particularly intended for dredge-fishing.

Another application of the invention is found in dredge-fishing of oysters, shell-fish, crustaceans, flat-fish, etc. FIG. 3. illustrates a variant particularly adapted to dredge-fishing for scallops. In this case, the process consists in creating two opposing effects, one intended to lift the items (scallops) and project them backwards and upwards, the other intended on the contrary to form a kind of barrier which aids in projecting them upwards and guides back to the desired trajectory those items with a tendency to escape.

By using two revolving cylinders (5a) and (5b) in parallel, rotated as described above, the scallops lifted by the first cylinder (5a) are recovered by the second (5b) and vice-versa in such a way that they directed in a clearly perpendicular trajectory and practically up the median line between the two cylinders, as the arrow (Tj) shows. They are then ejected towards the rear of the device, where they can be collected in a recovery net (57) intended for this purpose and positioned in such a way that the recovered items may escape from the vortex described above.

As above, a chassis (30) borne on wheels (2) carries a first cylinder (5a) turning on an axis (xa) situated perpendicularly to the direction of forward movement (T) of the device. The means of displacement, for example, a chain (53) engaged on a cogged gear (54) linking the axes of the wheel (2) and the first cylinder (5a), causes rotation in the same direction (Ra) as the direction of rotation as the wheels (R2).

An important characteristic of the invention is that a second rotating cylinder (5b) is arranged in parallel to the first cylinder (5a) carried likewise on the chassis (30). This is caused to rotate in a direction (shown by the arrow Rb) contrary to that (Ra) of the first cylinder (5a) and therefore also contrary to the direction of rotation (Rr) of the wheels (2).

If a transmission belt (44) is chosen as the means of transmission it is mounted in such a way that the same inversion of rotation is achieved.

Another important characteristic of the invention, when the device is used for fishing, is the recovery net (57) for example a pocket-shaped net able to collect all the items thrown up to the current created by the rotation of the two cylinders (5a) and (5b).

It is also possible for a deflecting shutter (9) to be employed. This has two functions: it forces the device down onto the sea floor and it adjusts the trajectory (Tj) of the items to be recovered and prevents them falling back into the zone of turbulence created by the cylinders.

When such a device is used with the invention, but without using the recovery net, the whole assembly can also be used in the application described above (harrow for sea-floor maintenance). Efficiency is improved and a single machine can be used for two functions: harrowing and dredge-fishing.

The invention described can be used in numerous ways, notably in aqua-culture (for cleaning and maintaining beds and for gathering the shell-fish) and in dredge-fishing (notably for scallops).

We claim:

1. A procedure for undermining underwater terrain and creating an upward rising current of water which comprises rotating at least two cylinders (5a) and (5b) while at the same time giving these cylinders a forward movement in such a way that a current is created capable of lifting items lying on the bottom and carrying them upwards according to a trajectory (Tj) away from the zone of turbulence (101) caused by said cylinders (5a), wherein the action of the two cylinders (5a) and (5b), acting in parallel, is combined so that they turn in contrary directions (Ra) and (Rb) in relation to each other, and that the two cylinders are moved in a direction (T) at the same time so that the current created by the second cylinder (5b) helps to direct those items with a tendency to escape backward towards the trajectory (Tj).

2. Procedure according to claim 1, characterized by the fact that the axis of rotation (xa) of the cylinders (5a) is parallel to the bottom (S) and perpendicular to the axis of movement (T) of the said cylinder (5a).

3. Procedure according to claims 2 or 1, characterized by the fact that the parameters governing the formation of the current of water are: the height (h) between the edge of the cylinder (5a) from the bottom (S); the diameter ($\phi1$) and the peripheral speed (Va) of the cylinder (5a).

4. A machine designed to undermine underwater terrain (S) and create an upward rising current (Tj) using the procedure described in claim 1; characterized by the fact that it is made up of a chassis (30) with two arms (3) supporting at least one cylinder (5a) rotating around an axis (xa) parallel to the bottom (S); the chassis (30) including a method of connection to a towing device able to move the machine forward in a direction (T) perpendicular to the axis of rotation (xa).

5. Machine according to claim 4, characterized by the fact that the chassis (30) is carried on wheels (2) whose rotation (R2) causes the rotation (Ra) of the cylinder (5a).

6. Machine according to one of claims 4 or 5, characterized by the fact that the chassis (30) is mounted on a second cylinder (5b) in parallel with cylinder (5a) and at a distance (E) from it, the second cylinder (5b) rotating in an opposite direction (Rb) to the first (Ra).

7. Machine according to one of claims 4 or 5, characterized by the fact that it includes a deflector (9) whose function is to direct the items lifted from the sea floor and prevent them from falling into the zone of turbulence (101) created by the cylinder (5a).

8. Machine according to one of claims 4 or 5, characterized by the fact that it also includes a recovery net (57) intended to gather the items lifted from the bottom (S) and directed according to the trajectory (Tj).

9. Machine according to one of claims 4 or 5, characterized by the fact that it can be used as a harrow for cleaning underwater terrain.

10. Machine according to claim 8, characterized by the fact that it can be used for dredge-fishing.

* * * * *